(12) United States Patent
Langer et al.

(10) Patent No.: US 12,534,905 B2
(45) Date of Patent: Jan. 27, 2026

(54) FASTENER SYSTEM AND METHOD

(71) Applicant: Norse Inc., Torrington, CT (US)

(72) Inventors: Alfred C. Langer, New Milford, CT (US); Christian Thomas, Lebanon, CT (US)

(73) Assignee: Norse Inc., Torrington, CT (US)

( * ) Notice: Subject to any disclaimer, the term of this patent is extended or adjusted under 35 U.S.C. 154(b) by 435 days.

(21) Appl. No.: 17/160,008

(22) Filed: Jan. 27, 2021

(65) Prior Publication Data

US 2021/0230860 A1   Jul. 29, 2021

Related U.S. Application Data

(60) Provisional application No. 62/966,210, filed on Jan. 27, 2020.

(51) Int. Cl.
*E04B 1/41* (2006.01)
*E04B 1/38* (2006.01)
*E04B 2/58* (2006.01)

(52) U.S. Cl.
CPC .............. *E04B 1/388* (2023.08); *E04B 2/58* (2013.01)

(58) Field of Classification Search
CPC ..................................... E04B 1/40; E04B 2/58
(Continued)

(56) References Cited

U.S. PATENT DOCUMENTS

| 659,069 A | 10/1900 | Ives |
| 1,350,713 A * | 8/1920 | Ferdon .................... E05C 19/14 |
| | | 292/DIG. 14 |

(Continued)

FOREIGN PATENT DOCUMENTS

| DE | 20208021 U1 | 8/2002 |
| EP | 2899482 A1 | 7/2015 |
| GB | 2309252 A | 7/1997 |

OTHER PUBLICATIONS

International Search Report and Written Opinion issued in International Application No. PCT/US21/15329 on Apr. 21, 2021, 15 pages.

*Primary Examiner* — James J Buckle, Jr.
(74) *Attorney, Agent, or Firm* — McCarter & English, LLP

(57) ABSTRACT

A fastening system for joining two structural members is provided. The fastening system includes a latching device comprising a housing, at least one eccentric rotatable part and a generally S shaped latch spring hook joined to the rotatable part, and a receiver having at least one hole configured to receive a free end of the latch spring hook. In one embodiment, the bottom portion of the housing is generally semi-circular in shape and the receiver includes two semi-circular frames having a corresponding radius to receive the lower portion of the housing. The latching device is fixed to a first structural member and the receiver is fixed to a second structural member. The structural members may be joined by positioning an end of the first structural member adjacent to the receiver of the second structural member and rotating the rotatable part to cause the free end of the latch spring hook to engage the hole in the receiver. Further rotation of the eccentric rotatable part causes the latch spring hook to exert a pulling force, thereby joining the structural members together. The semi-circular lower portion of the housing and the semi-circular frames on the receiver allows the structural members to be attached at any desired angle using one fastening system.

25 Claims, 22 Drawing Sheets

(58) Field of Classification Search
USPC .......................................................... 52/698
See application file for complete search history.

(56) References Cited

U.S. PATENT DOCUMENTS

| | | |
|---|---|---|
| 1,517,995 A | 12/1924 | Langenau et al. |
| 2,378,654 A | 6/1945 | Pekny |
| 2,647,287 A * | 8/1953 | Jones .................. E04B 1/34321 |
| | | D25/33 |
| 2,714,751 A | 8/1955 | Stuart et al. |
| 2,741,341 A * | 4/1956 | Anderson ............. F25D 23/063 |
| | | 292/109 |
| 3,019,043 A | 1/1962 | Woodworth et al. |
| 3,140,889 A | 7/1964 | Sanders |
| 3,191,244 A | 6/1965 | Burke |
| 3,309,115 A * | 3/1967 | Langer ...................... E04B 2/74 |
| | | 52/DIG. 1 |
| 3,327,447 A | 6/1967 | Nissley |
| 3,353,314 A | 11/1967 | Melcher |
| 3,365,223 A * | 1/1968 | Bisbing ............... E05B 65/0817 |
| | | 292/65 |
| 3,392,497 A | 7/1968 | Kenneth |
| 3,400,958 A | 9/1968 | Leonard et al. |
| 3,437,363 A | 4/1969 | Walters |
| 3,437,364 A | 4/1969 | Walters |
| 3,472,545 A | 10/1969 | Berkowitz |
| 3,484,832 A | 12/1969 | Langer |
| 3,496,692 A | 2/1970 | Melcher |
| 3,528,690 A | 9/1970 | Langer |
| 3,565,469 A | 2/1971 | Frederik |
| 3,647,251 A | 3/1972 | Brown et al. |
| 3,661,410 A | 5/1972 | Larson et al. |
| 3,712,653 A * | 1/1973 | Lehmann .............. E04B 1/6183 |
| | | 292/65 |
| 3,784,240 A | 1/1974 | Berkowitz |
| 3,806,174 A | 4/1974 | Herman |
| 3,830,705 A * | 8/1974 | Dewegeli ................. B01D 3/02 |
| | | 202/83 |
| 4,020,613 A * | 5/1977 | Reynolds ............ E05B 65/0817 |
| | | 403/321 |
| 4,021,064 A | 5/1977 | Kruzan et al. |
| 4,065,161 A | 12/1977 | MacMaster |
| 4,160,610 A | 7/1979 | Austen-Brown et al. |
| 4,223,500 A | 9/1980 | Clark et al. |
| 4,326,739 A * | 4/1982 | Schlueter ................. E05C 19/14 |
| | | 292/DIG. 49 |
| 4,392,281 A | 7/1983 | Metz et al. |
| 4,417,430 A | 11/1983 | Loikitz |
| 4,502,807 A | 3/1985 | Salice |
| 4,507,010 A * | 3/1985 | Fujiya .................. E04B 1/6183 |
| | | 403/323 |
| 4,512,122 A | 4/1985 | Berkowitz |
| 4,664,548 A | 5/1987 | Brinkmann |
| 4,804,215 A | 2/1989 | Bisbing |
| 4,930,931 A | 6/1990 | Matsui |
| 5,257,839 A | 11/1993 | Nielsen et al. |
| 5,424,118 A | 6/1995 | McLaughlin |
| 5,452,925 A | 9/1995 | Huang |
| 5,667,261 A | 9/1997 | Weinerman et al. |
| 6,018,920 A | 2/2000 | Fancher |
| 6,041,721 A * | 3/2000 | Weston ................... E05C 19/14 |
| | | 108/65 |
| 6,070,919 A | 6/2000 | Finkelstein |
| 6,079,754 A | 6/2000 | Alexy |
| 6,119,427 A | 9/2000 | Wyman et al. |
| 6,386,788 B1 | 5/2002 | Finkelstein et al. |
| 6,409,235 B1 | 6/2002 | Finkelstein |
| 6,478,347 B1 | 11/2002 | Timothy |
| 6,626,017 B2 | 9/2003 | Herbeck et al. |
| 7,007,321 B2 | 3/2006 | Polevoy et al. |
| D541,628 S | 5/2007 | Arthurs et al. |
| 7,716,895 B2 | 5/2010 | Fairorth et al. |
| 8,186,189 B2 | 5/2012 | Brisco et al. |
| 8,240,942 B2 * | 8/2012 | Baur .................... F16B 12/2036 |
| | | 403/321 |
| 8,434,797 B2 | 5/2013 | Langer |
| 8,528,288 B1 | 9/2013 | Kinser, Jr. |
| 8,776,472 B1 | 7/2014 | Kinser, Jr. |
| 9,803,403 B2 * | 10/2017 | Finkelstein ............ F16B 5/0004 |
| 9,863,143 B2 * | 1/2018 | Finkelstein ............ E04B 1/6183 |
| 10,450,009 B2 | 10/2019 | Yamamoto et al. |
| 10,711,490 B2 | 7/2020 | Zhang et al. |
| 10,745,905 B2 | 8/2020 | Hodson et al. |
| 10,865,592 B2 | 12/2020 | Liang et al. |
| 11,118,376 B1 | 9/2021 | Liang et al. |
| 11,339,819 B2 | 5/2022 | Yao et al. |
| 11,408,666 B2 | 8/2022 | Yao et al. |
| 11,486,132 B2 | 11/2022 | Gottschling |
| 11,549,534 B2 * | 1/2023 | Meyer ....................... F16B 2/18 |
| 11,656,021 B2 | 5/2023 | Shibuya et al. |
| 2003/0011192 A1 | 1/2003 | Herbeck et al. |
| 2010/0043346 A1 | 2/2010 | Lancer |
| 2015/0211267 A1 | 7/2015 | Finkelstein |
| 2017/0081848 A1 | 3/2017 | Finkelstein et al. |
| 2017/0121961 A1 | 5/2017 | Hodson et al. |
| 2020/0200202 A1 | 6/2020 | Meyer et al. |
| 2021/0293015 A1 | 9/2021 | Gottschling |
| 2023/0167636 A1 | 6/2023 | Keller et al. |

* cited by examiner

FASTENER SYSTEM AND METHOD

This application claims priority under 35 U.S.C. § 119(e) to U.S. Provisional Application Ser. No. 62/966,210 filed on Jan. 27, 2020, the entire contents of which are hereby incorporated by reference.

FIELD OF THE INVENTION

The invention relates generally to fasteners and fastening systems and methods for quick, easy and secure fastening together of two or more components, such as structural members.

BACKGROUND

It is desirable to join components together in a quick but secure fashion. In the case of structural members, such as those used to construct buildings, frames and other structures, various joining mechanisms have long been known, including fasteners such as nails, screws, rivets, and adhesives such as glues. Certain materials such as metals and plastics may be joined by welding or by other types of application of heat. However, such methods can be time-consuming, require specialized tools, or require highly specialized skills to perform correctly.

The present inventor has invented several latch/receiver fasteners in which a latch is attached to one component, a receiver is attached to another component, and, by use of a simple tool, the latch can engage the receiver and connect the two components together. Examples of these inventions are shown in U.S. Pat. Nos. 3,309,115, 3,484,832, and 8,434,797, which are incorporated by reference in their entirety.

Such fasteners have been used, for example, to join metal stud sections in parallel arrangements as seen in FIGS. 1A and 1B. As seen in FIG. 1A, latch component 210 is attached to metal stud section 215 and receiver component 220 is attached to metal stud section 225. Latch 210 has a latch spring hook that engages receiver 220 to secure the stud metal sections 215, 225 together.

The metal studs 215, 225 also include respective further receiver components 230, 235. Metal stud section 240 includes two further latch spring hooks 245 and 250. When the latch spring hooks 245, 250 engage the receivers 230, 235, metal stud 240 is secured to metal studs 215 and 225 as seen in FIG. 1B.

While the latch and receiver system described above allows structural members such as metal studs to be securely fastened together, it does not allow a first structural member to be joined end-on to a second structural member. It would be desirable to have a latch and receiver fastening system for joining two components, such as two structural members in an end-on manner.

SUMMARY

It is an object of the present invention to provide fasteners and systems to join two components such as two metal structural members with one structural member end-on to a second structural member.

It is a further object of the present invention to provide methods of joining two components such as two metal structural members with one structural member end-on to a second structural member.

A still further object of the present invention is to provide fastener systems and methods of joining metal structural members in a relatively quick manner.

Yet another object of the present invention is to provide that the joined metal structural members can be disassembled from each other in a relatively quick manner.

These and other advantages of the invention will become more readily apparent in view of the following detailed description of certain embodiments and accompanying drawings.

In one embodiment, the fastener system for joining two structural members comprises at least one latching device configured to be mounted on a first structural member, and at least one receiver configured to be mounted on a second structural member, wherein the at least one latching device comprises a housing, at least one eccentric rotatable part and at least one latch spring hook having a first end attached to the at least one rotatable part, wherein the receiver comprises a plate configured to receive a second end of the latch spring hooks, and wherein the latching device and the receiver are configured such that an end of the first structural member may be fastened to a side of the second structural member.

In one embodiment of the fastening system, the latching device comprises a plurality of eccentric rotatable parts and a plurality of latch spring hooks, and the receiver comprises one of a bail or a strike configured to receive the plurality of latch spring hooks.

In another embodiment of the fastening system, the bail or strike is mounted to the receiver on a hinge.

In another embodiment of the fastening system, a plurality of eccentric rotatable parts are joined by an axle.

In another embodiment of the fastening system, the receiver further comprises tabs configured to guide the first structural member to align the latching device and the receiver to fasten the first structural member to the second structural member.

In another embodiment of the fastening system, the receiver further comprises transverse locators and the housing further comprises notches corresponding to the transverse locators to guide the first structural member to align the latching device and the receiver to fasten the first structural member to the second structural member.

In another embodiment of the fastening system, the housing has a bottom portion with a generally semi-circular shape and the receiver has a plurality of semi-circular frames having a radius corresponding to the radius of the bottom portion of the housing to receive the bottom portion of the housing.

In another embodiment of the fastening system, the housing extends beyond the end of the first structural member and the receiver is mounted on an inner surface of the second structural member such that the structural member may be joined end-to-end.

In another embodiment the present invention provides a method for fastening a first structural member to a second structural member comprising the steps of (a) providing a first structural member having at least one latching device mounted on the first structural member, wherein the at least one latching device comprises a housing, at least one eccentric rotatable part and at least one latch spring hook having a first end attached to the at least one rotatable part, (b) providing a second structural member having at least one receiver mounted on the second structural member, wherein the receiver is configured to receive a second end of the latch spring hooks and wherein the latching device and the receiver are configured such that an end of the first structural member may be fastened to a side of the second structural member, (c) aligning the first structural member and the second structural member such that the at least one latch spring hook is aligned with the receiver, (d) rotating the rotatable parts such that the second end of the latch spring hook engages the receiver, and (e) further rotating the rotatable parts such that the latch spring hook exerts a retractive force on the receiver, thereby securing the first structural member to the second structural member.

In one embodiment of the method, the latching device comprises a plurality of eccentric rotatable parts and a plurality of latch spring hooks, and the receiver comprises one of a bail or a strike configured to receive the plurality of latch spring hooks.

In another embodiment of the method, the bail or strike is mounted to the receiver on a hinge.

In another embodiment of the method, the eccentric rotatable parts are joined by an axle.

In another embodiment of the method, the receiver further comprises tabs configured to guide the first structural member to align the latching device with the receiver to fasten the first structural member to the second structural member.

In another embodiment of the method, the receiver further comprises transverse locators and the housing further comprises notches corresponding to the transverse locators to guide the first structural member to align the latching device with the receiver to fasten the first structural member to the second structural member.

In another embodiment of the method, the housing has a bottom portion with a generally semi-circular shape and the receiver has a plurality of semi-circular frames having a radius corresponding to the radius of the bottom portion of the housing.

In another embodiment of the method, the rotatable parts are rotated by inserting a rotating tool in the center of the rotatable parts.

In another embodiment of the method, the housing extends beyond the end of the first structural member and the receiver is mounted on an inner surface of the second structural member such that the structural member may be joined end-to-end.

This summary is not exhaustive of the scope of the aspects and embodiments of the invention. Thus, while certain aspects and embodiments have been presented and/or outlined in this summary, it should be understood that the inventive aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow, but in any case are not exhaustive or limiting.

It should also be understood that any aspects and embodiments that are described in this summary and elsewhere in this application and do not appear in the claims that follow are preserved for later presentation in this application or in one or more continuation patent applications.

BRIEF DESCRIPTION OF THE DRAWINGS

Exemplary embodiments, which are understood not to be limiting, are described in greater detail hereafter with reference to the drawings.

DETAILED DESCRIPTION

The present invention is directed to a fastening system for attaching two components together. In one embodiment, the components are structural members such as metal studs. In one embodiment, the fastening system of the present invention allows the end of a first structural member to be attached to a second structural member in an end-o or "T" type of configuration wherein the first structural member is perpendicular to the second structural member. Alternatively, the first structural member may be attached at an angle to the second structural member.

In another embodiment, the fastening system allows two structural members to be joined end to end. The structural members may be joined end to end at any desired angle.

The fastening system of the present invention comprises a housing for a latching device having at least one latch spring hook attached to an eccentric rotatable part mounted on a first component and a receiver mounted on a second component. In one embodiment, the components are structural members such as metal studs. The latching device and receiver are complementarily designed and mounted on the respective structural members such that the latch spring hook will engage the receiver with clamping force upon rotation of the rotatable part.

Figure 1A:
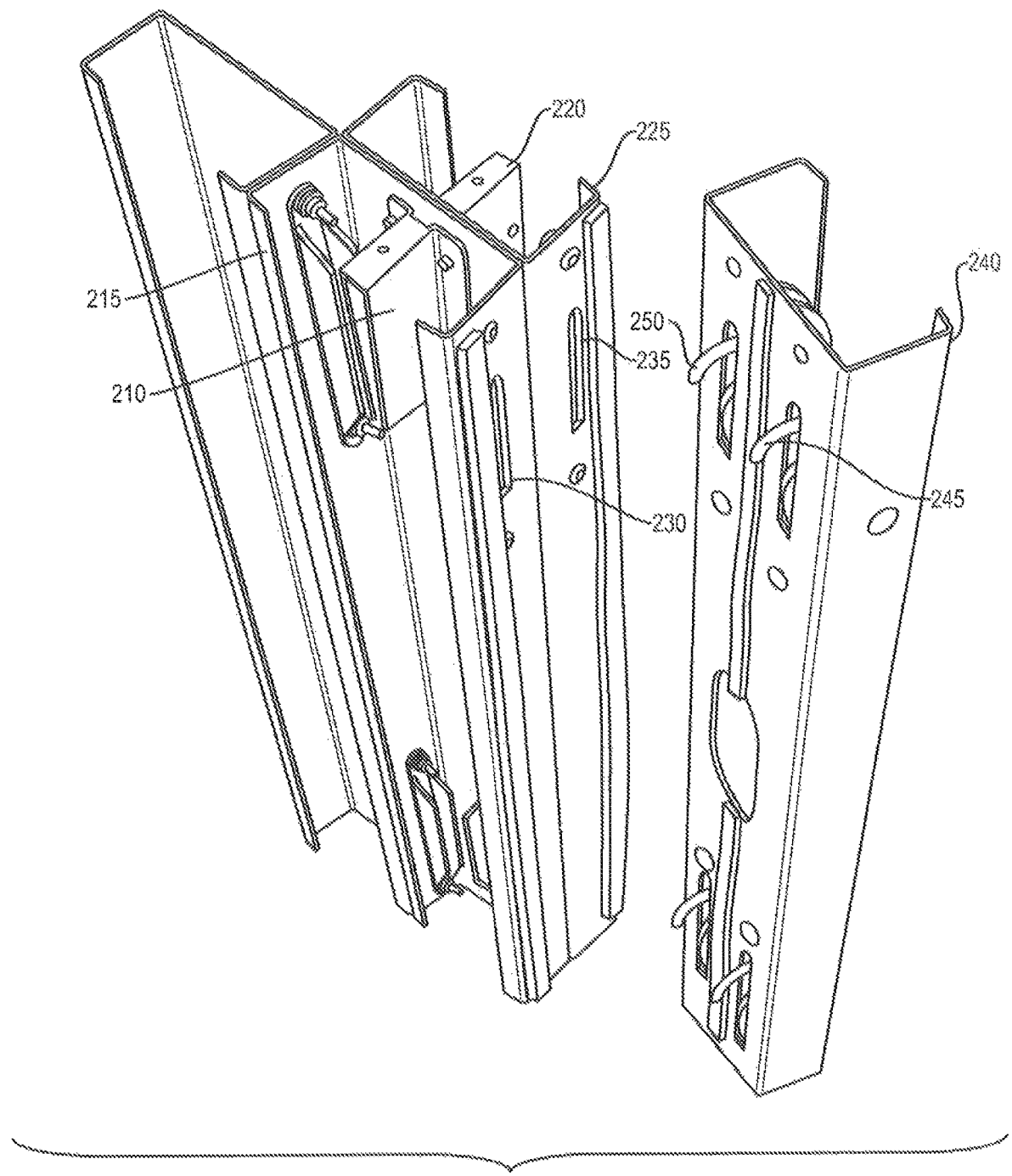
FIG. 1A shows a structure with metal studs that are joined to each other in a parallel manner using a prior art fastener system.
Figure 1B:
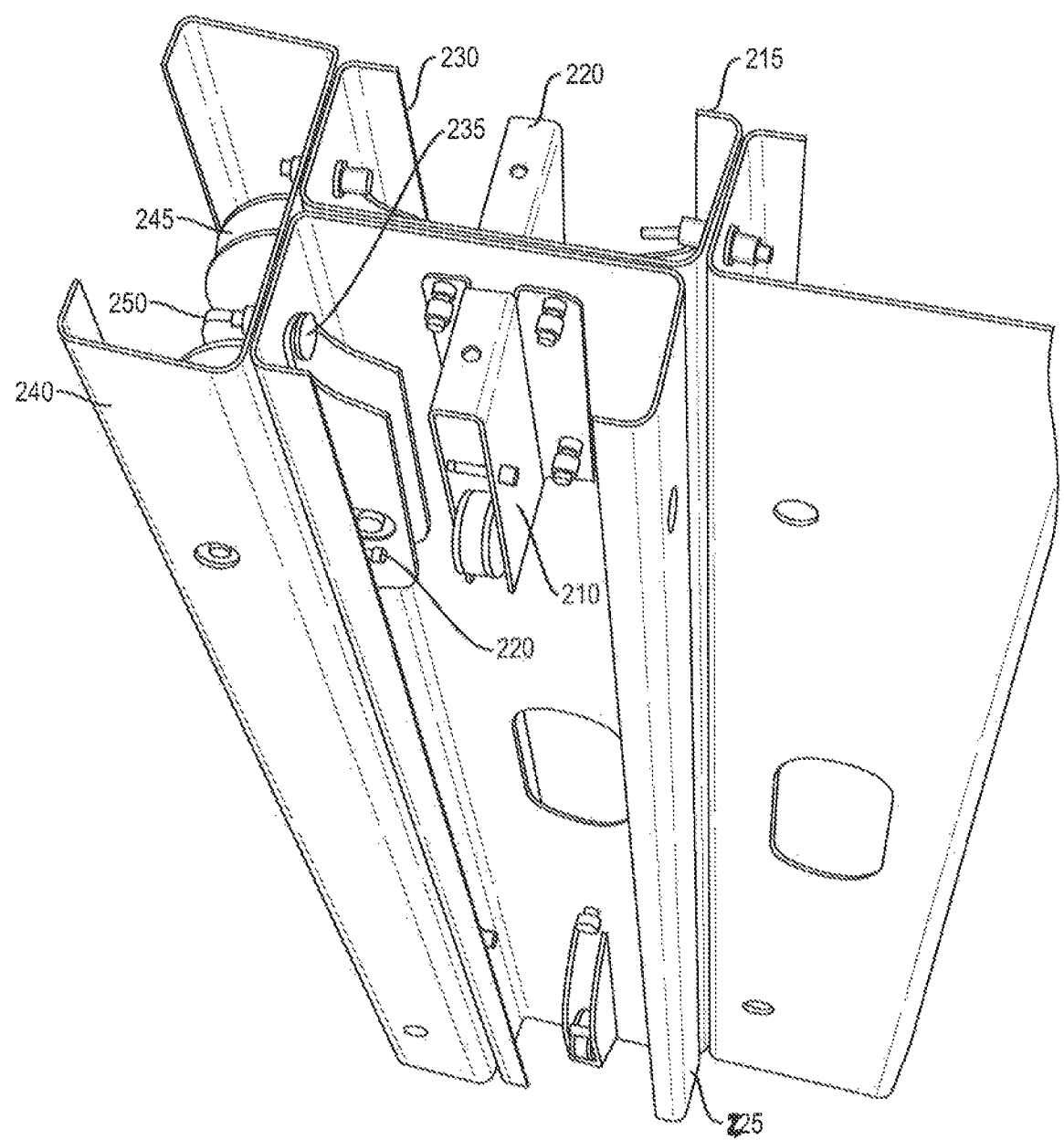
FIG. 1B shows an additional metal stud joined to the structure of FIG. 1A in a parallel manner using a prior art fastener system.
Figure 2:
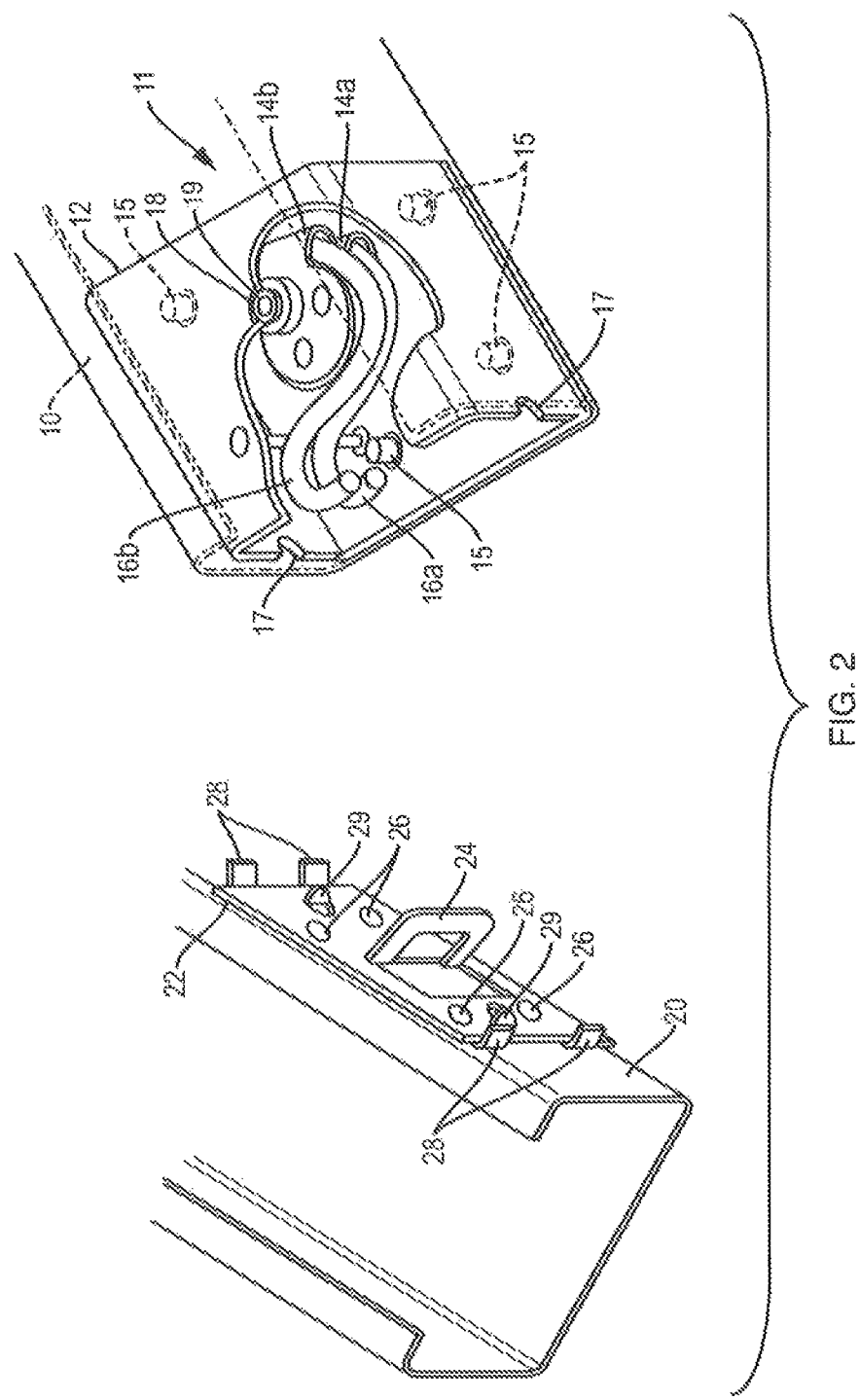
FIG. 2 is a side view of an embodiment of the fastening system showing a latching mechanism fastened to a first structural member and a receiver fastened to a second structural member with latch spring hooks in the disengaged position.

Referring to FIG. 2, in one embodiment a latching device 11 comprises a housing 12, two eccentric rotatable parts 14a, 14b and two generally S shaped latch spring hooks 16a, 16b. The latching device is fixedly attached to a first structural member 10 using any appropriate means, such as screws, welds or rivets. In the embodiment shown in FIG. 2, the latching device 11 is attached to the first structural member 10 by rivets 15 extending through the housing 12 and the structural member 10. The housing 12 is open at the end of the structural member 10 to allow the ends of the latch spring hooks to engage a receiver as described below. In the embodiment shown in FIG. 2, the latching device has two latch spring hooks 16a, 16b which increases both the strength and the stability of the connection between the structural members. The invention is not limited in this regard, and the latching device may comprise any desired number of latch spring hooks.

The latch spring hooks 16a, 16b are attached to eccentric rotatable parts 14a, 14b that eccentrically rotate. The two rotatable parts may be joined by an axle 18 to allow the rotatable parts to be rotated together. Alternatively, the latch spring hooks 16a, 16b may be attached to a single rotatable part. The axle 18 includes an opening 19 that is shaped to receive an correspondingly shaped operating tool to rotate the rotatable part. The opening 19 in axle 18 can have any shape that allows insertion of a tool having a corresponding shape to operate the rotatable parts by rotating the axle 18. In one embodiment, the opening 19 is hexagonally shaped and an operating tool such as an Allen wrench is used to rotate the axle 18. In another embodiment that does not include an axle, each rotatable part has an opening to receive an operating tool and the operating tool extends through each of the rotatable parts.

As further shown in FIG. 2, a receiver 22 is fixedly attached to a second structural member 20. The receiver 22 may be attached to the second structural member using any appropriate means, such as screws, welds or rivets. In the embodiment shown in FIG. 2, the receiver is attached to the structural member using rivets 26. The receiver 22 comprises a metal plate having a bail 24 for receiving the latch spring hooks 16a, 16b. The bail 24 extends upwardly from the receiver 22 to receive the latch spring hooks 16a, 16b. In one embodiment, the bail is substantially perpendicular to the structural member 20.

In one embodiment, the receiver 22 includes upwardly bent end tabs 28 that engage the outer surfaces of the first structural member 10 to align the structural members such that the latch spring hooks are aligned to engage the bail 24 on the receiver 22. The end tabs 28 also help to maintain the structural members in place, i.e., prevent lateral slip. The receiver may also include transverse locator tabs 29 that extend upwardly from the receiver 22 to engage corresponding slots 17 in the housing 12 to further assist in aligning the structural members.

Figure 4:
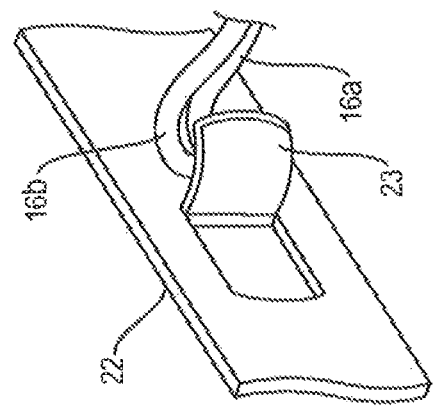
FIG. 4 is a side view of one embodiment of a receiver having a strike to engage the latch spring hooks.
Figure 3:
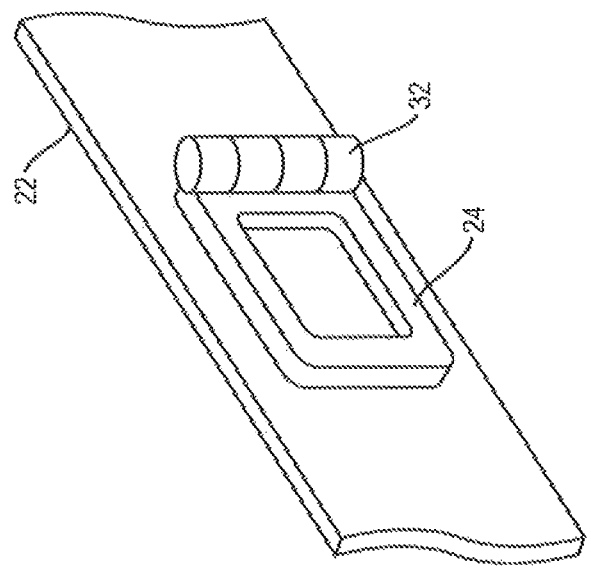
FIG. 3 is a side view of an embodiment of a receiver having a hinged bail to receive the latch spring hooks.

In one embodiment shown in FIG. 3, the bail 24 is mounted on receiver 22 by a hinge 32. The hinge allows the bail 24 to engage the latch hooks 16a, 16b with the first structural member 10 at any desired angle relative to the second structural member 20. In another embodiment shown in FIG. 4, the receiver 22 includes a strike 23 for receiving the ends of the latch spring hooks 16a, 16b. The strike 23 may be mounted on the receiver 22 on a hinge to allow the first structural member 10 to be mounted to the second structural member 20 at any desired angle.

In FIG. 2, the latch spring hooks are shown in the disengaged position. To fasten the first structural member 10 to the second structural member 20, the end of the first structural member is placed against the receiver 22 fixed to the second structural member 20. Operating means is inserted into the opening 19 in axle 18 joining the eccentric rotatable parts 14a, 14b. The operating means may be a conventional hexagonal operating tool, such as an Allen wrench, that is inserted into a corresponding hexagonal opening in the axle.

When the operating means is rotated forward, the latch spring hooks 16a, 16b are rotated from the disengaged position to the engaged positon where the latch spring hooks 16a, 16b engage the bail 24 on the receiver 22. Due to the eccentricity of the rotatable parts, further rotation of the rotatable parts 14a, 14b shortens the extension length of the latch spring hooks 16a, 16b, and the latch spring hooks move away from the receiver and stretch to exert a retractive or pulling force on the receiver 22 in a direction substantially parallel to the axis of the first structural member. This force maintains the first structural member 10 fastened to the second structural member 20.

The structural members can be separated by rotating the rotatable parts 14a, 14b in the opposite direction, which lengthens the extension of the latch spring hooks and releases the retractive force, releasing the clamping pressure on the receiver 22, and allowing latch spring hooks 16a, 16b to be released from the bail 24 on the receiver 22.

Figure 5:
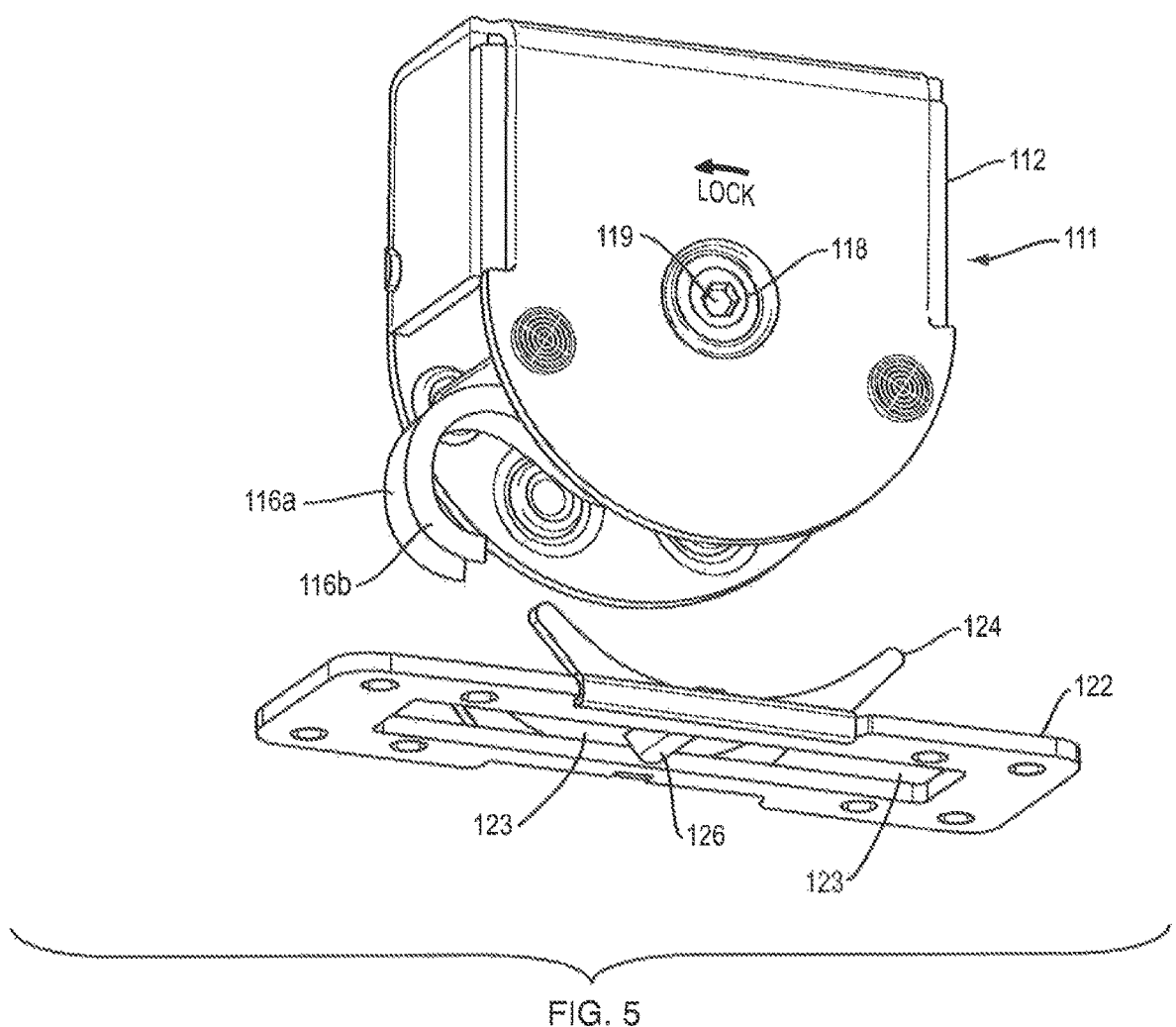
FIG. 5 is a side view of an embodiment of the fastening system showing a housing having a generally semi-circular lower portion and a receiver having a correspondingly semi-circular shaped frame for receiving the housing.
Figure 6:
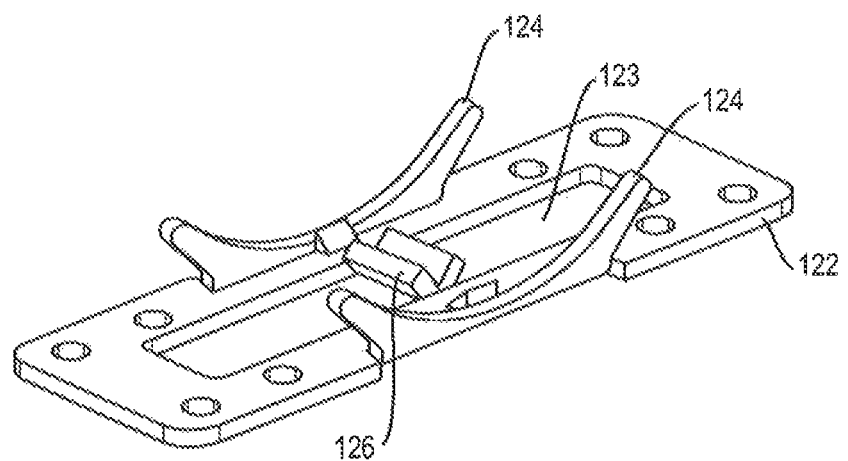
FIG. 6 is a side view of a receiver having a semi-circular frame for receiving a housing having a semi-circular bottom portion.
Figure 7:
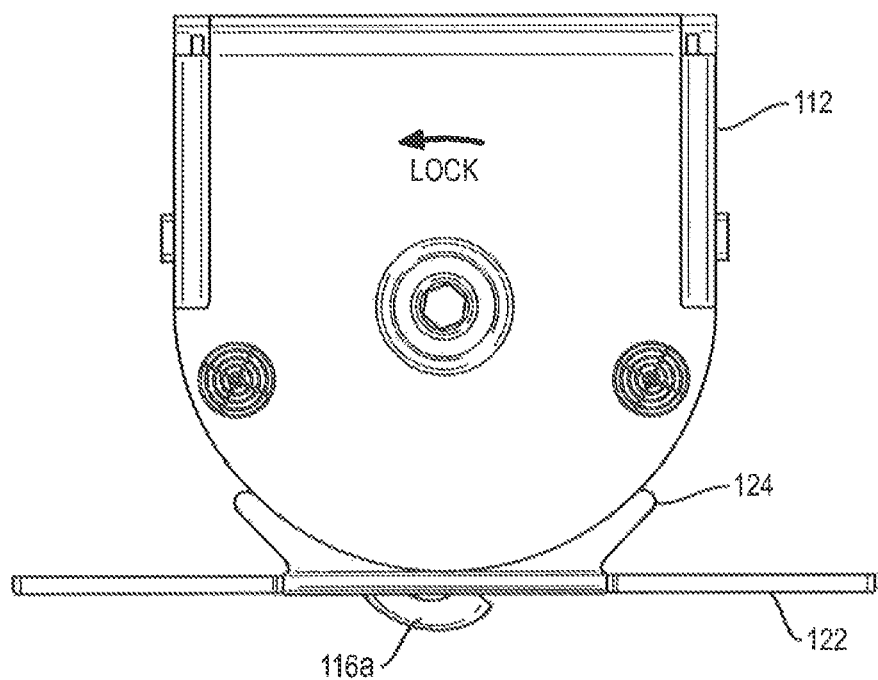
FIG. 7 is a side view of the fastening system with the spring latch hooks in the engaged position.
Figure 9:
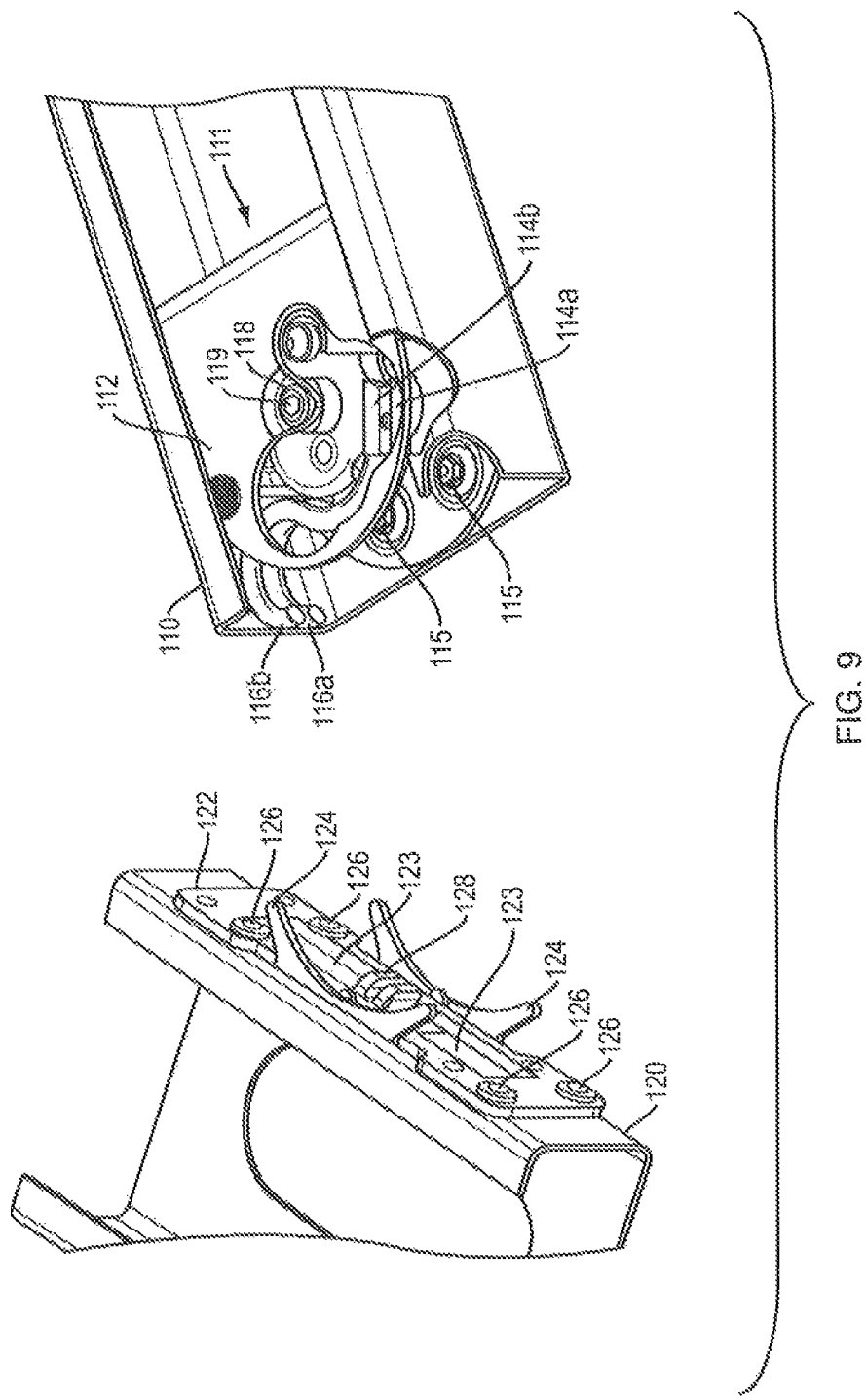
FIG. 9 is a top view of the fastening system of FIG. 5 with the latching device and the receiver attached to structural members and the latching device in the disengaged position.

In another embodiment shown in FIG. 5, the latching device 111 includes a housing 112 with the open portion of the housing having a semi-circular shape and two latch spring hooks 116a, 116b. As shown in FIGS. 5 and 6, in this embodiment the receiver 122 includes two semi-circular shaped frames 124 extending upwardly from the receiver 122 and having a radius that corresponds to the radius of the semi-circular bottom portion of the housing. The receiver 122 has two generally rectangular shaped openings 123 and a member 126 that extends across and defines one side of the rectangular openings at approximately the center of the semi-circular frames 124. As shown in FIGS. 7 and 9, the frames 124 have a circular shape with a radius that corresponds to the radius of the lower portion of the housing 112 to allow the housing 112 to engage the frames 124 when the latching device 111 is engaged with the receiver 122.

Figure 8:
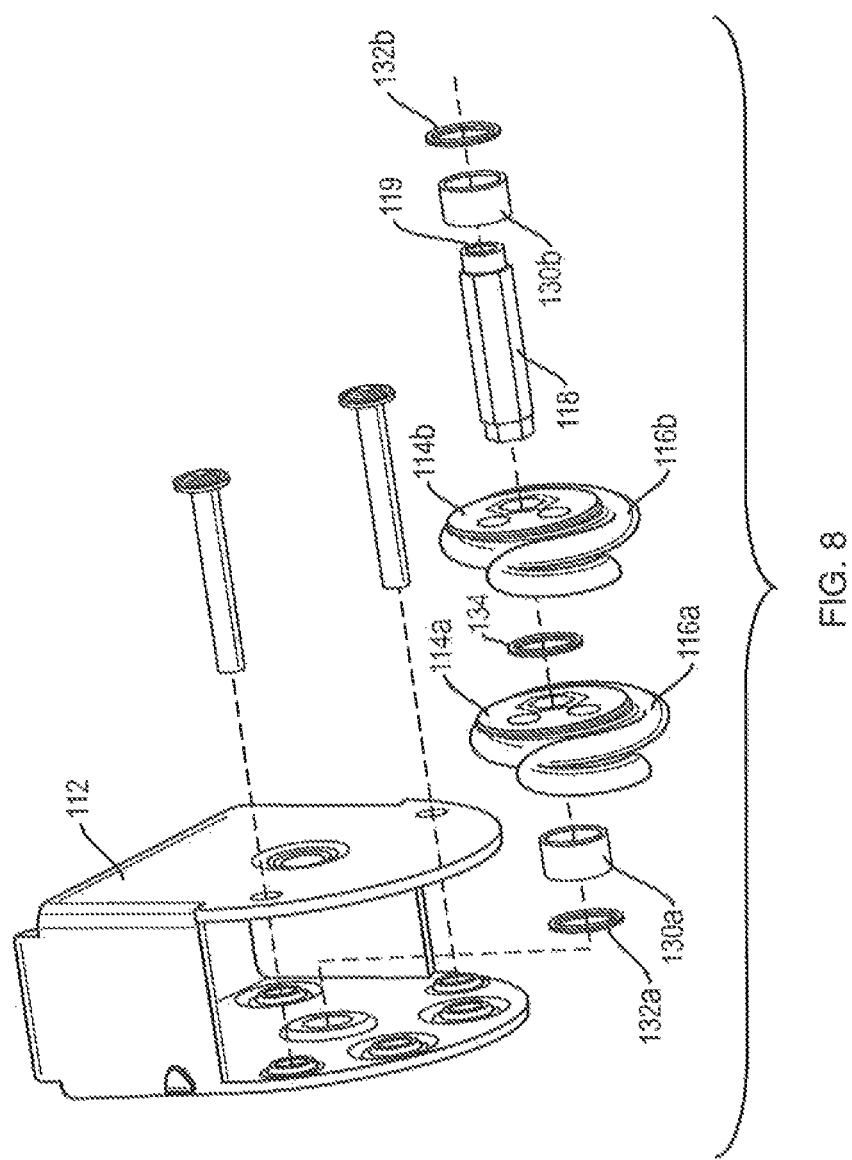
FIG. 8 is an exploded view of the housing and latching mechanism.

FIG. 8 shows an exploded view of the components of the latching device within housing 112. The latching device includes two latch spring hooks 116a, 116b attached to eccentric rotatable parts 114a, 114b. The rotatable parts 114a, 114b include a hexagonally shaped center for receiving the hexagonally shaped axle 118. The axle 118 includes a hexagonally shaped opening 119 to receive an operating tool (not shown) for rotating the rotatable parts 114a, 114b. The axle is held in place in the housing by spacers 130a, 130b. Wave washers 132a, 132b are provided between the axle 118 and the housing 112. Spacer 134 is provided between the rotating parts 114a, 114b.

FIG. 9 shows a latching device 111 having a semi-circular lower portion attached to a first structural member 110 by rivets 115 and a receiver 122 having corresponding semi-circular frames 124 attached to a second structural member 120 by rivets 126. To fasten the first structural member 110 to the second structural member 120, the end of the first structural member is placed against the receiver 122 fixed to the second structural member 120. Operating means is inserted into the opening 119 in axle 118. The operating means may be a conventional hexagonal operating tool, such as an Allen wrench, that is inserted into a corresponding hexagonal opening 119 in the axle 118.

When the operating means is rotated forward, the latch spring hooks 116a, 116b are rotated from the disengaged position to the engaged positon where the latch spring hooks 116a, 116b extend through the rectangular opening 123 in the receiver 122 and the structural member and engage the engagement member 128 on the receiver 122. Due to the eccentricity of the rotatable parts, further rotation of the rotatable parts 114a, 114b shortens the extension length of the latch spring hooks 116a, 116b, and the latch spring hooks exert a retractive or pulling force on the receiver 122 in a direction substantially parallel to the axis of the first structural member. This force maintains the first structural member 110 fastened to the second structural member 120. The structural members can be separated by rotating the rotatable parts 114a, 114b in the opposite direction, which lengthens the extension of the latch spring hooks and releases the retractive force, releasing the clamping pressure on the receiver 122, and allowing latch spring hooks 116a, 116b to be released from the bail 124 on the receiver 122.

Figure 10:
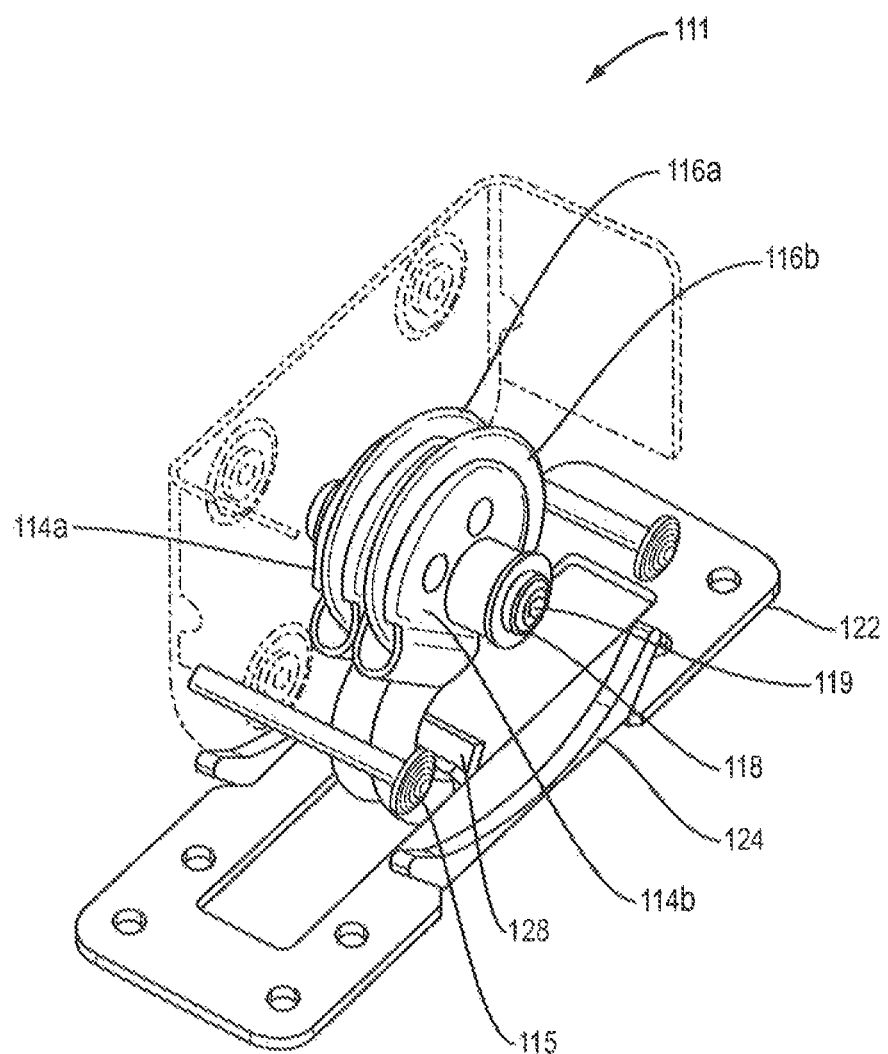
FIG. 10 is a side view showing the latching mechanism within the housing.

FIG. 10 is a view of the assembled latching device 111 with the latch spring hooks 116a, 116b engaged with the engagement member 128 on the receiver 122.

Figure 11:
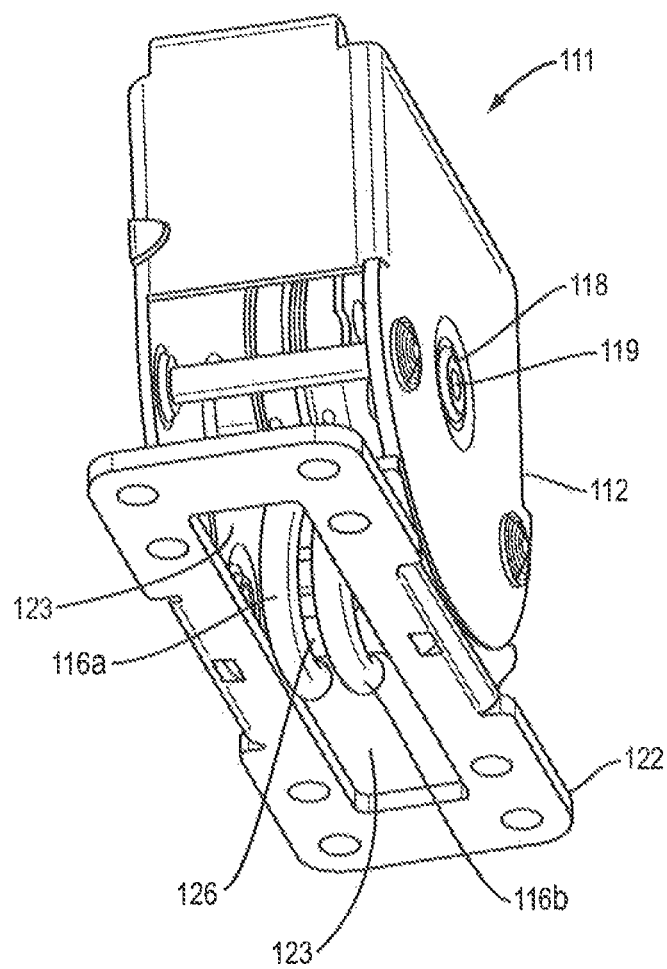
FIG. 11 is a back view of the fastening system with the spring latch hooks in the engaged position.
Figure 12:
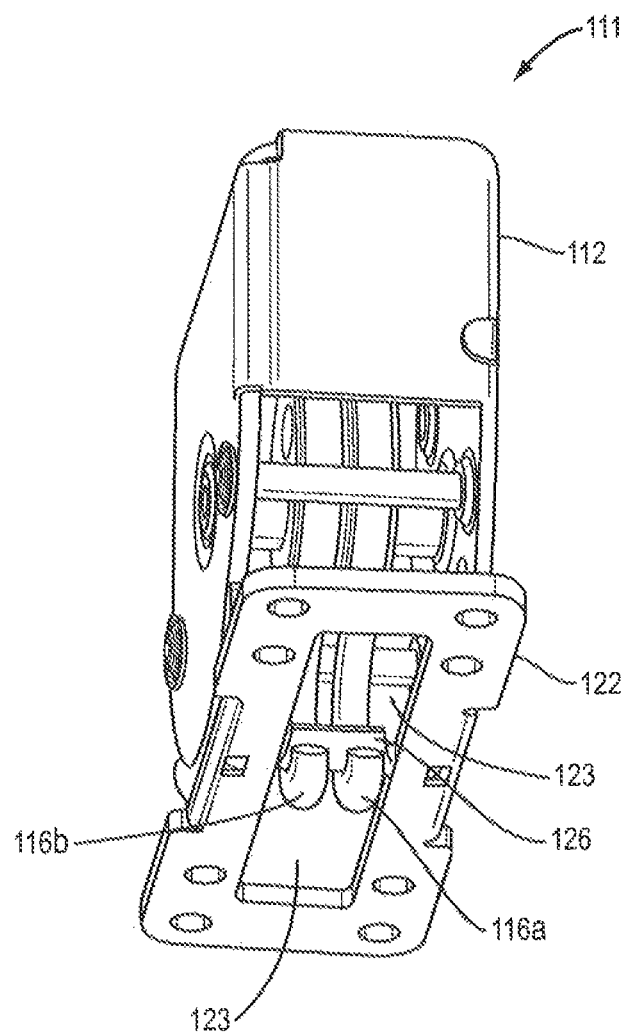
FIG. 12 is a front view of the fastening system with the spring latch hooks in the engaged position.

FIGS. 11 and 12 show the latching device 111 in the engaged position with the receiver 122. The latch spring hooks 116a, 116b are shown extending through the rectangular openings 123 to engage the engagement member 128 on the receiver 122 to fasten the latching device 111 to the receiver 122.

Figure 13:
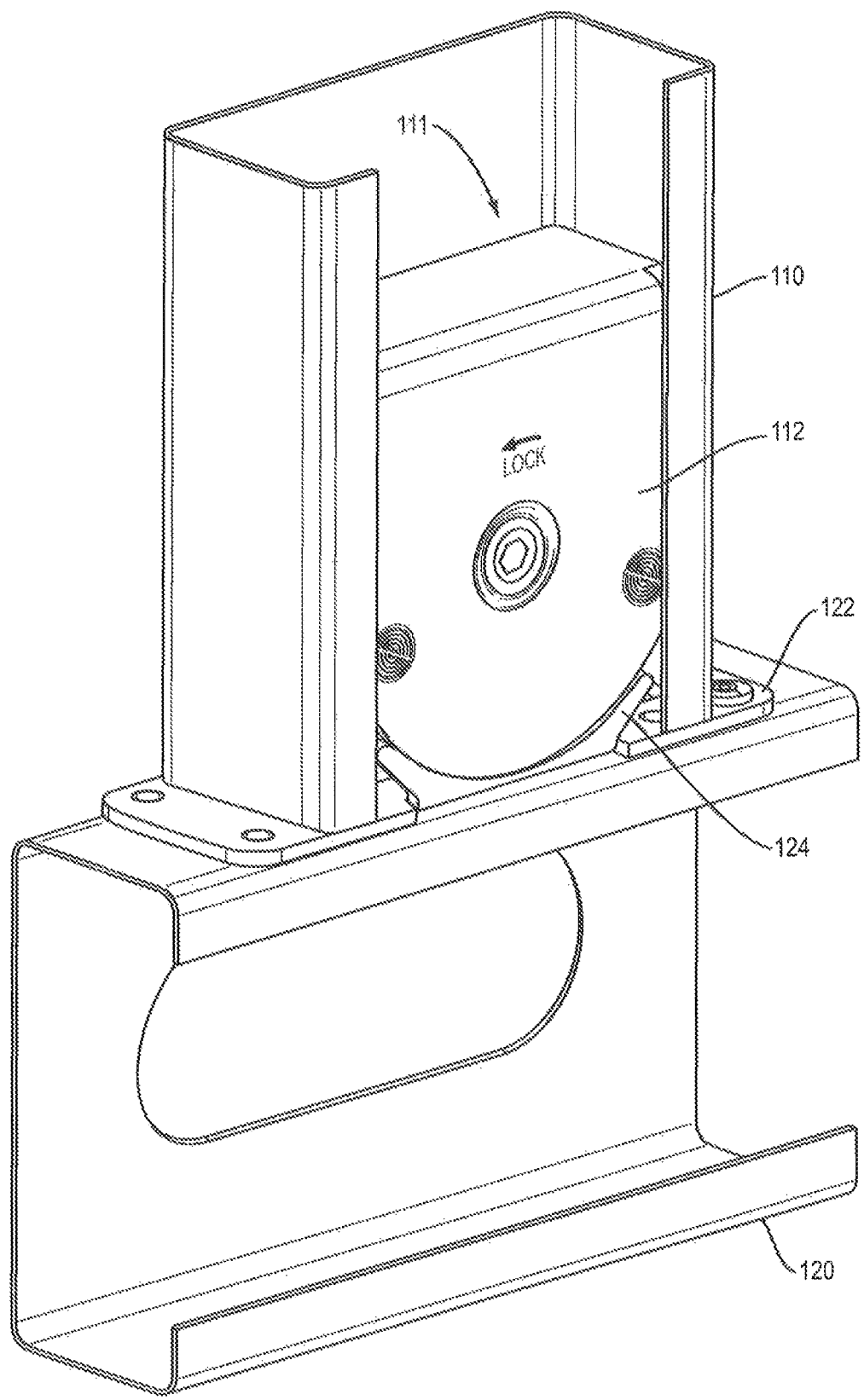
FIG. 13 is a front view showing the fastening system in the engaged position to fasten two structural members in a perpendicular orientation.
Figure 14:
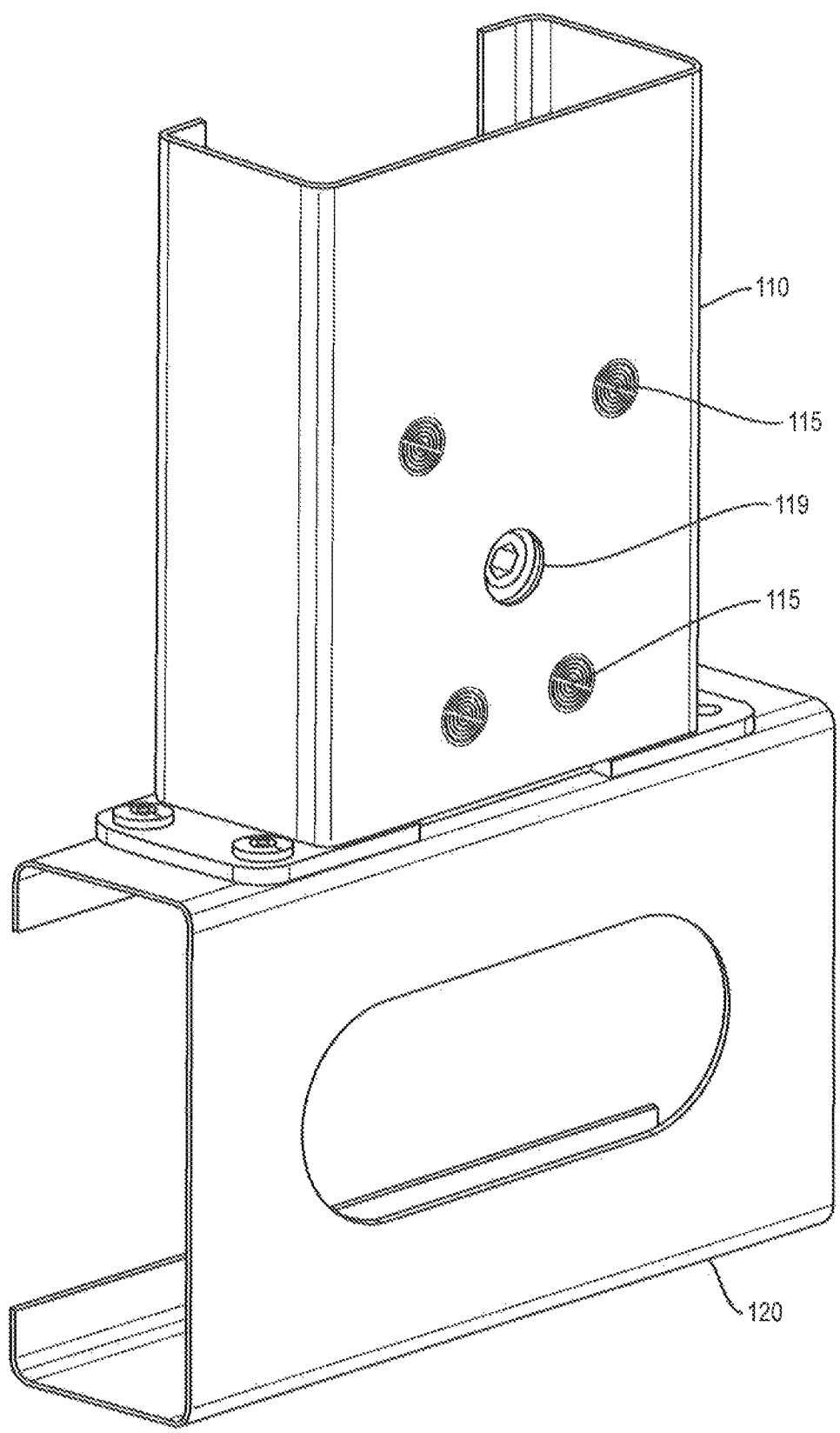
FIG. 14 is a back view showing the fastening system in the engaged position to fasten two structural members in a perpendicular orientation.
Figure 15:
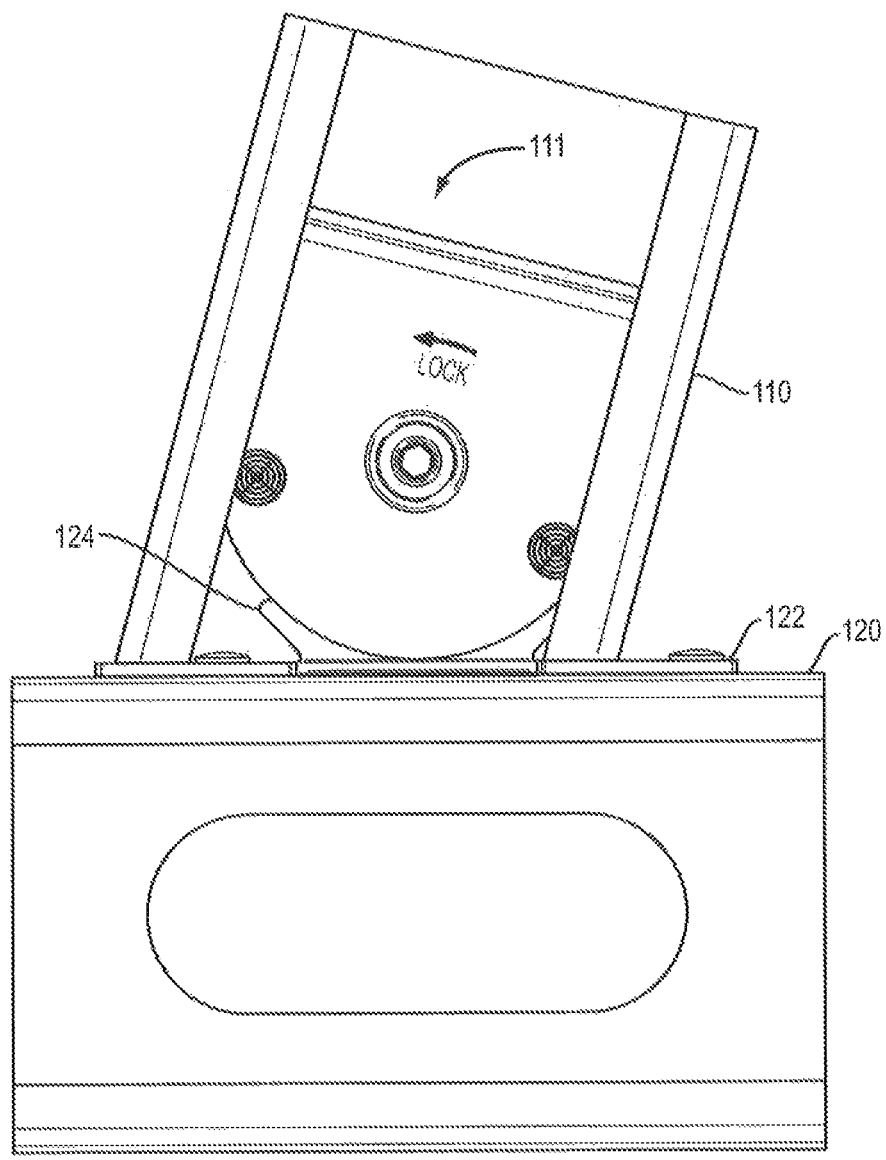
FIG. 15 is a front view showing the fastening system in the engaged position to fasten two structural members in an angled orientation.
Figure 16:
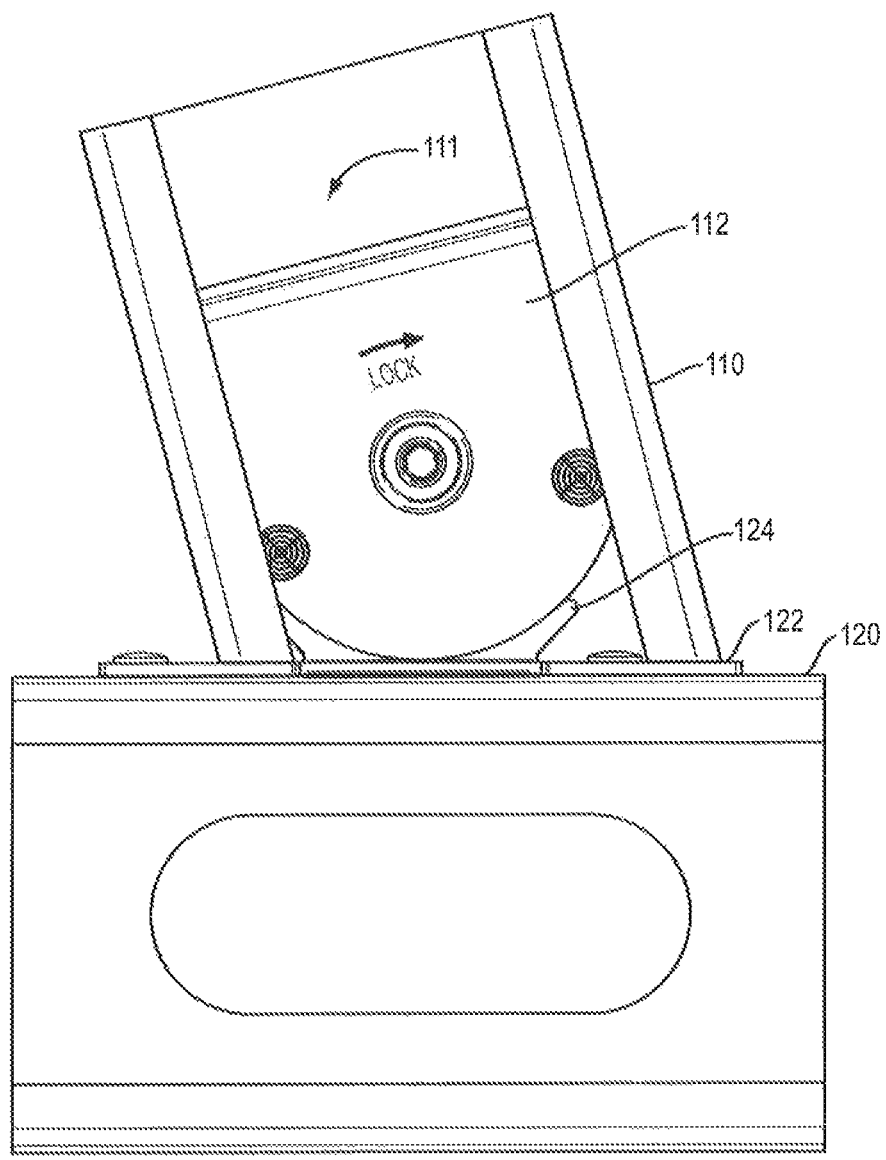
FIG. 16 is a front view showing the fastening system in the engaged position to fasten two structural members in an angled orientation.
Figure 17:
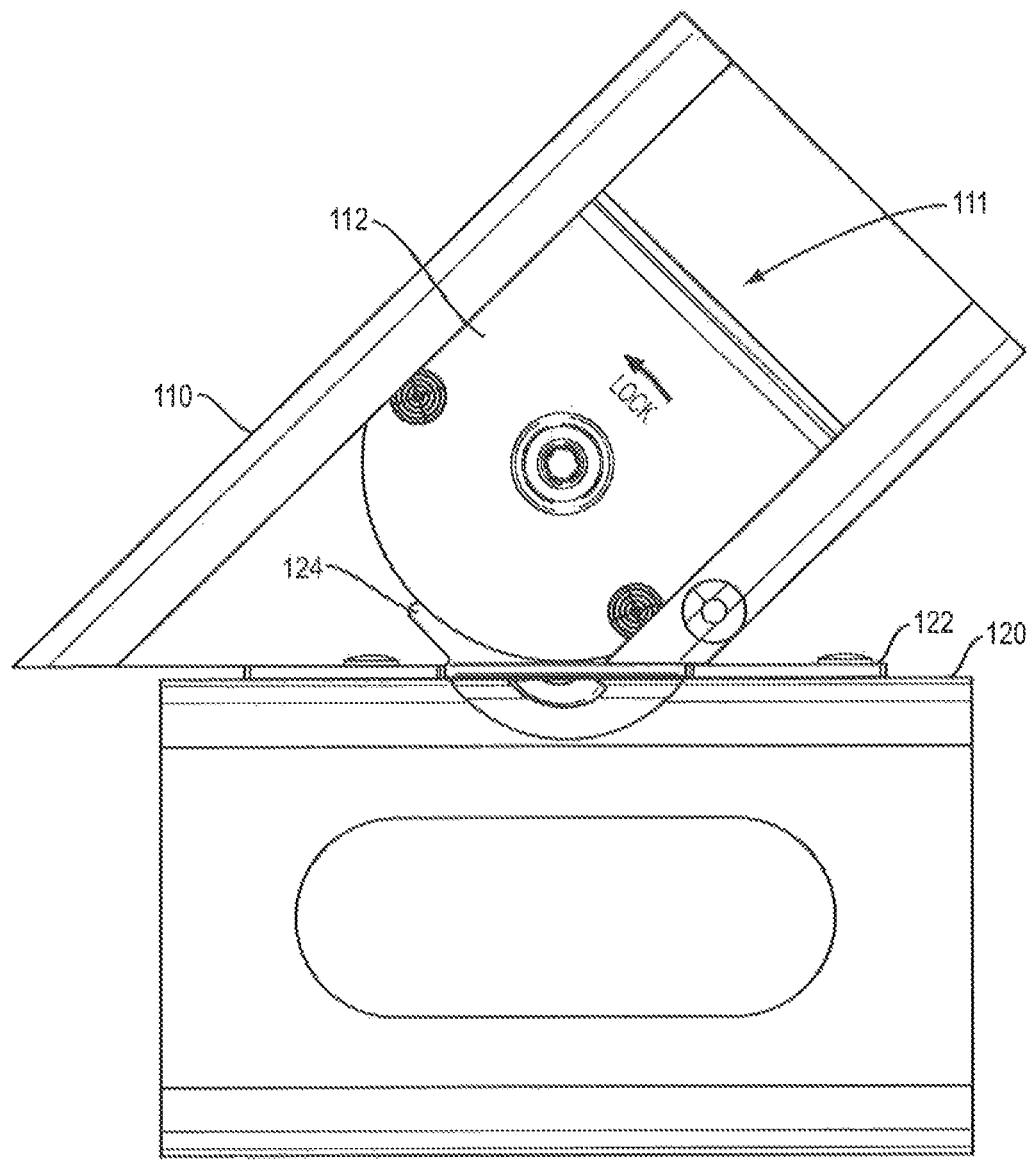
FIG. 17 is a front view showing the fastening system in the engaged position to fasten two structural members in an angled orientation.
Figure 18:
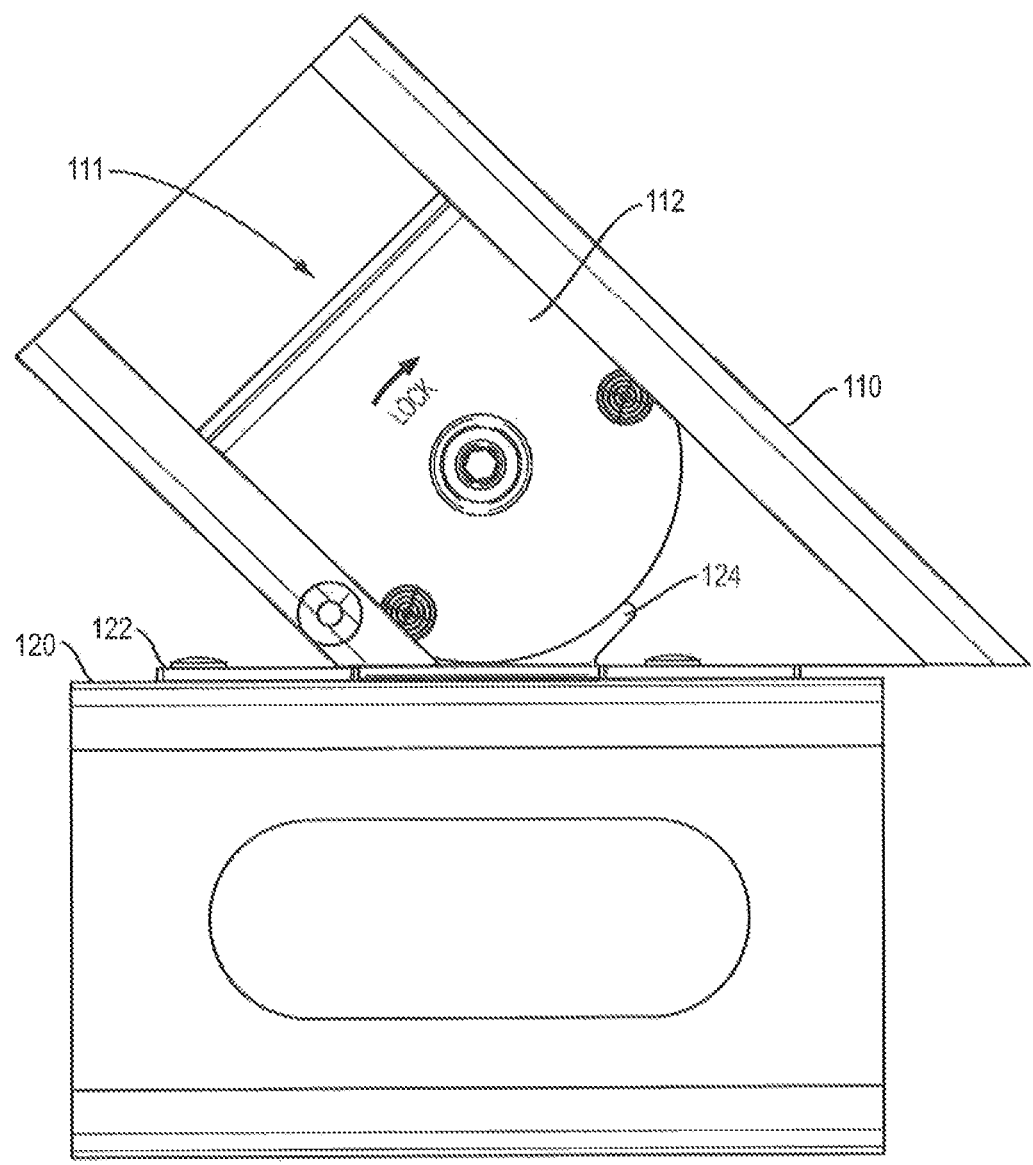
FIG. 18 is a front view showing the fastening system in the engaged position to fasten two structural members in an angled orientation.

FIGS. 13 and 14 show a latching device 111 attached to a first structural member 110 and a receiver 122 attached to a second structural member 120. The latching device is engaged such that the first structural member is fastened to the second structural member in a perpendicular or "T" shaped configuration. The semi-circular bottom portion of the housing 112 is engaged by the correspondingly semi-circular frames 124 on receiver 122.

FIGS. 15-18 show a latching device 111 attached to a first structural member 110 and a receiver 122 attached to a second structural member 120. The latching device is engaged such that the first structural member is fastened to the second structural member at an angle. The semi-circular bottom portion of the housing 112 is engaged by the correspondingly semi-circular frames 124 on receiver 122.

As can be seen in FIGS. 13-18, one advantage of this embodiment of the invention is that the semi-circular lower portion of the housing and the semi-circular frames on the receiver allow the structural members to be attached at any desired angle using one fastening system.

Figure 19:
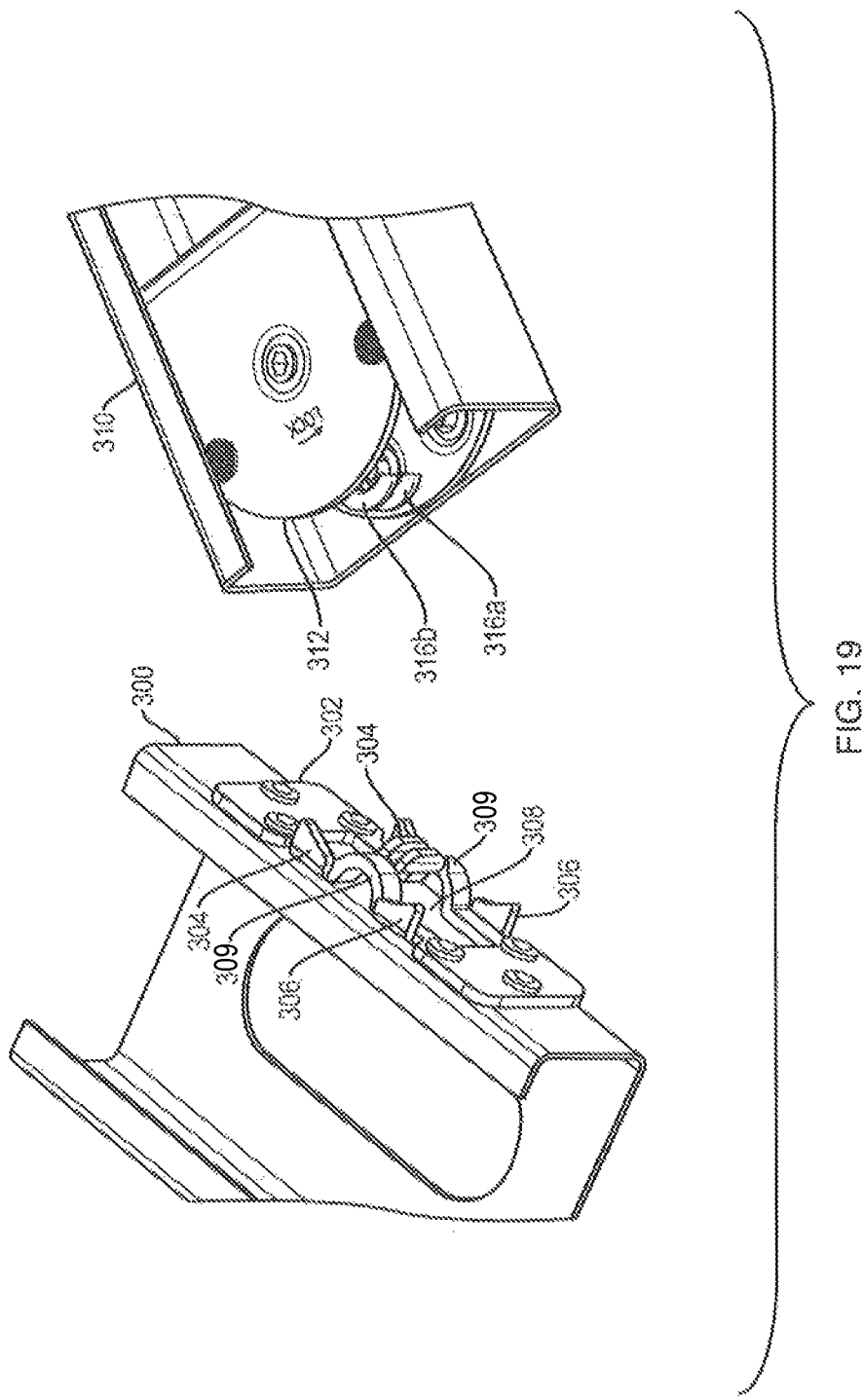
FIG. 19 is a perspective view of an embodiment of the fastening system having a receiver with a raised beam for engaging one or more latch spring hooks.

In another embodiment shown in FIG. 19, the fastening system comprises a receiver 302 having a raised beam 304 extending between semi-circular frames 304, 306. Semi-circular frames 304, 306 have a radius corresponding to the radius of the housing. Raised beam 304 extends between beam supports 309 above the face of the structural member 300. The beam supports 309 are positioned relative to the semi-circular frames 304, 306 such that when the housing engages the semi-circular frames the beam supports are received within the housing. The raised beam provides sufficient clearance such that the latch spring hooks 316a, 316b in housing 312 attached to structural member 310 can engage the raised beam 304 to join structural members 300, 310. The raised beam 304 eliminates the need to cut out sections from the face of structural member 300 to provide clearance for engaging and detaching the latch spring hooks from the receiver.

Figure 20:
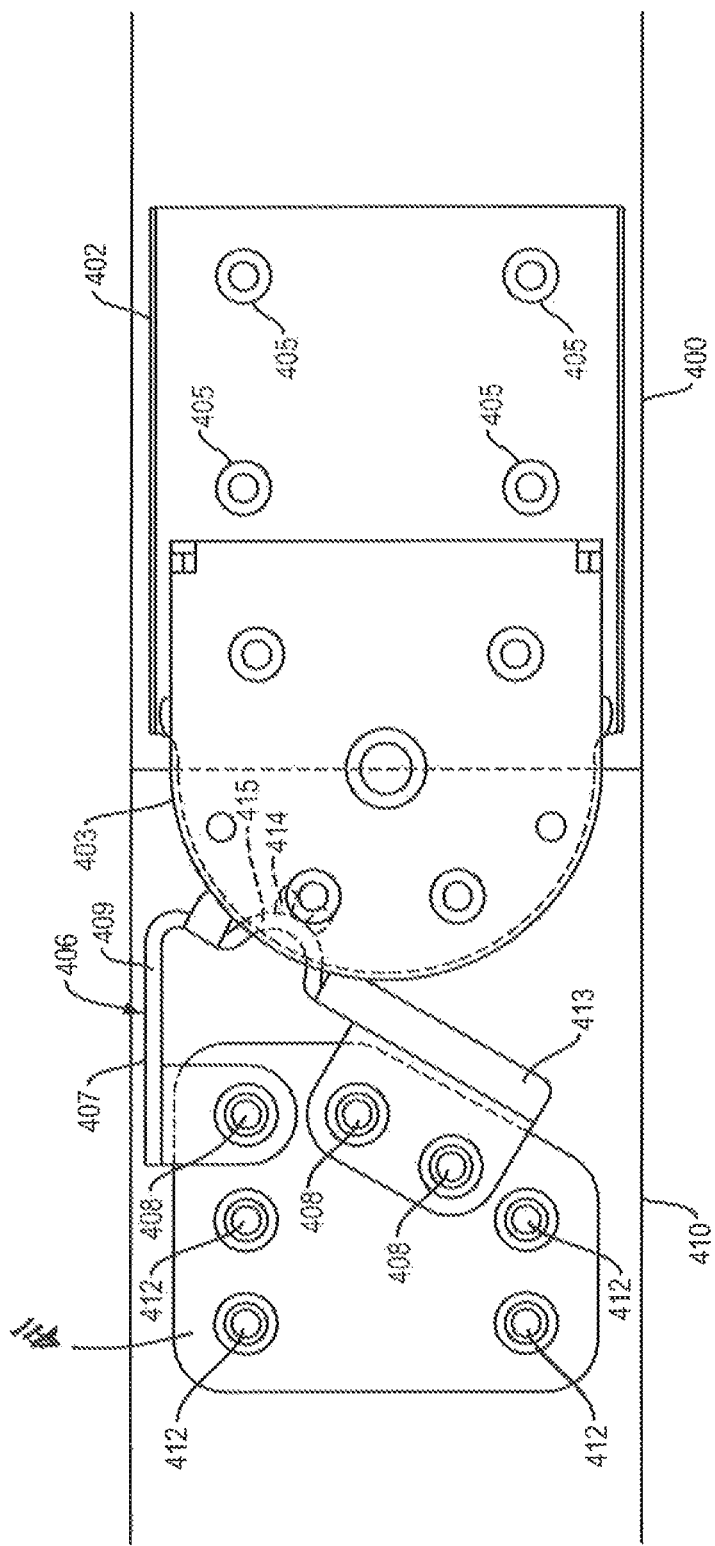
FIG. 20 is a side view of an embodiment of the fastening system with a receiver assembly with a raised beam for engaging one or more latch spring hooks and a housing having an extended base showing two structural members coupled in an end to end manner.
Figure 21:
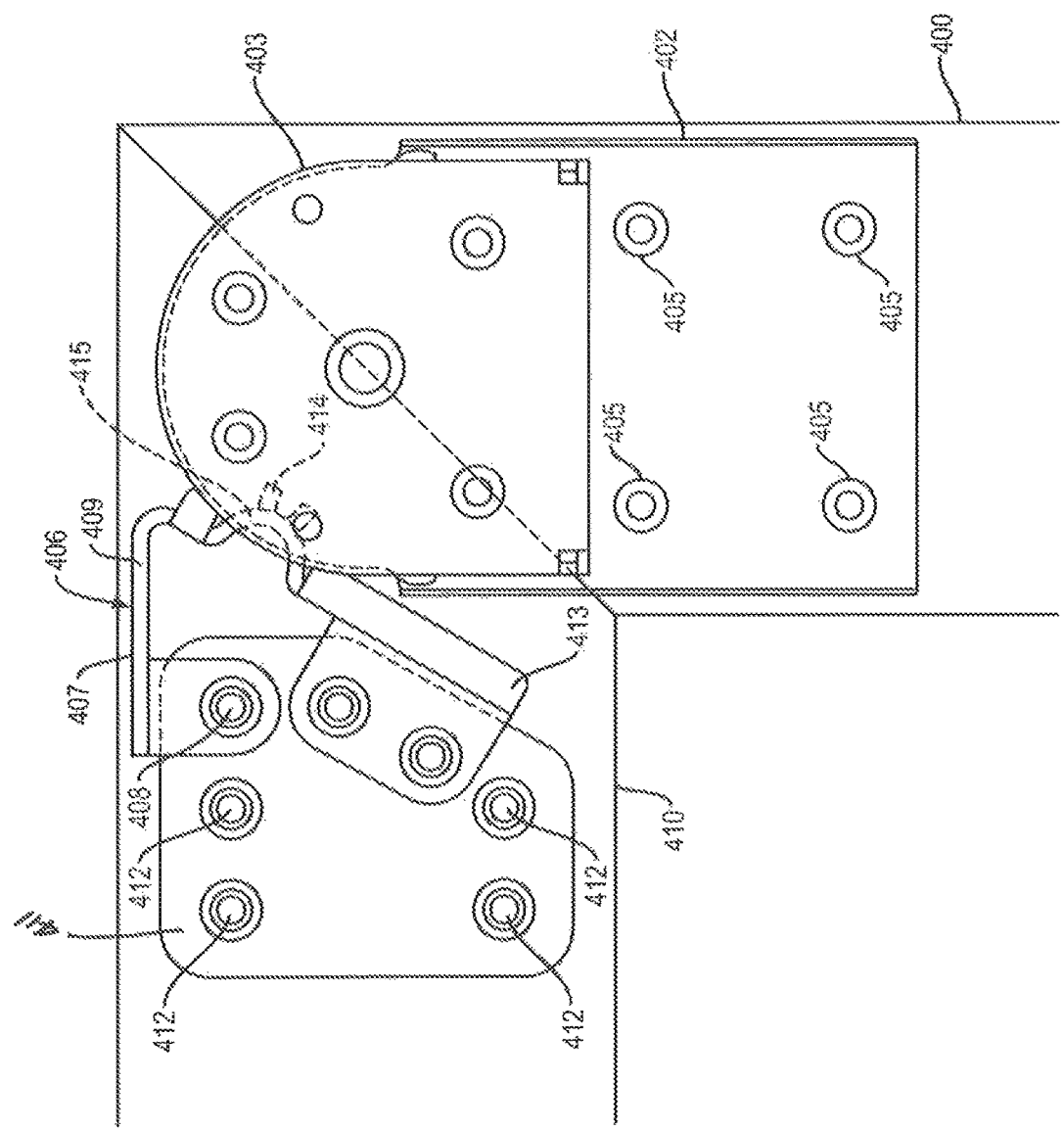
FIG. 21 is a side view of the embodiment of the fastening system in FIG. 20 showing two structural members coupled end to end at an angle.

Another embodiment of a fastening system used for joining structural members is illustrated in FIGS. 20-23. This embodiment of the fastening system allows two structural members to be joined together in an end-to-end manner. As shown in FIGS. 20 and 21, in this embodiment of the fastening system, housing 402 is rounded on a distal end and houses a latching device (not shown) having at least one latch spring hook. Housing 402 is attached to first structural member 400 by rivets 405 or by other attachment means such as screws. Housing 402 comprises a substantially rectangular portion and a semi-circular portion 403. The semi-circular portion 403 extends beyond the end of structural member 400.

A receiver assembly 406 is fixedly attached to a second structural member 410 using rivets 412 or any other appropriate attachment means such as screws. Receiver assembly 406 comprises a base plate 411 and a receiver 407 fixedly mounted to the base plate 411. At least a portion of one side of the base plate 411 is angled. The receiver 407 may be mounted to the base plate using rivets 408 or any other appropriate means such as screws. The receiver comprises a first leg 409 that is oriented at an angle to a second leg 413 corresponding to the angle on one side of the base plate 411. This results in the receiver being oriented at an angle relative to the end of the structural member 410. Receiver 407 includes a beam 414 extending between beam supports 415. The beam 414 receives the at least one latch spring hook from the latching device in housing 402. As shown in FIG. 21, this embodiment of the fastening system allows two structural members to be joined end to end at any desired angle.

Figure 22:
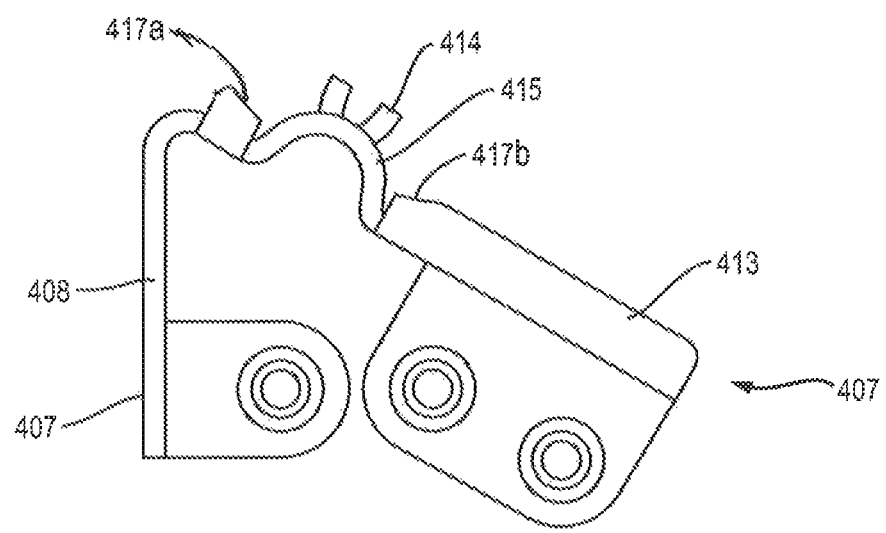
FIG. 22 is a side view of the receiver for the receiver assembly of FIG. 20.

FIG. 22 shows a side view of the receiver 407. Receiver includes surfaces 417a, 417b that are shaped to correspond to and receive the surface of the housing 402. The beam 414 for receiving the latch spring hooks is supported by two beam supports 415 as described previously.

While the certain embodiments are described above, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A fastening system for joining two structural members comprising:

at least one latching device configured to be mounted on a first structural member, and at least one receiver configured to be mounted on a second structural member, wherein the at least one latching device comprises a housing, at least one eccentric rotatable part and a latch spring hook having a first end attached to the at least one rotatable part, wherein the at least one receiver comprises a plate configured to receive a second end of the latch spring hook, wherein the at least one latching device and the at least one receiver are configured such that said first structural member may be fastened to said second structural member whereby at least part of the receiver is receivable within the first structural member, and wherein the at least one latching device is configured such that the latch spring hook extends or is extendible from an area of said first structural member defining an end of said first structural member such that said end may be fastened to and in contact with said second structural member.

2. A fastening system for joining two structural members comprising:

at least one latching device configured to be mounted on a first structural member, and at least one receiver configured to be mounted on a second structural member, wherein the at least one latching device comprises a housing, at least one eccentric rotatable part and a latch spring hook having a first end attached to the at least one rotatable part, wherein the at least one receiver comprises a plate configured to receive a second end of the latch spring hook, wherein the at least one latching device and the at least one receiver are configured such that said first structural member may be fastened to said second structural member, wherein the at least one latching device is configured such that the latch spring hook extends or is extendible from an area of said first structural member defining an end of said first structural member such that said end may be fastened to and in contact with said second structural member, and wherein the at least one latching device comprises a plurality of eccentric rotatable parts and a plurality of latch spring hooks, and the at least one receiver comprises one of a bail or a strike configured to receive the plurality of latch spring hooks.

3. The fastening system of claim 2, wherein the eccentric rotatable parts are joined by an axle.

4. A fastening system for joining two structural members comprising:

at least one latching device configured to be mounted on a first structural member, and at least one receiver configured to be mounted on a second structural member, wherein the at least one latching device comprises a housing, at least one eccentric rotatable part and a latch spring hook having a first end attached to the at least one rotatable part, wherein the at least one receiver comprises a plate configured to receive a second end of the latch spring hook, wherein the at least one latching device and the at least one receiver are configured such that an end of said first structural member may be fastened to said second structural member, and wherein the at least one receiver further comprises transverse locators and the housing further comprises notches corresponding to the transverse locators to guide the first structural member to align the at least one latching device with the at least one receiver to fasten the first structural member to the second structural member.

5. A fastening system for joining two structural members comprising:

at least one latching device configured to be mounted on a first structural member, and at least one receiver configured to be mounted on a second structural member, wherein the at least one latching device comprises a housing, at least one eccentric rotatable part and a latch spring hook having a first end attached to the at least one rotatable part, wherein the at least one receiver comprises a plate configured to receive a second end of the latch spring hook, wherein the at least one latching device and the at least one receiver are configured such that an end of said first structural member may be fastened to said second structural member, and wherein the housing has a bottom portion with a generally semi-circular shape and the at least one receiver has a plurality of semi-circular frames having a radius corresponding to the radius of the bottom portion of the housing, wherein the first structural member can be joined at an angle to the second structural member.

6. A fastening system for joining two structural members comprising:

at least one latching device configured to be mounted on a first structural member, and at least one receiver configured to be mounted on a second structural member, wherein the at least one latching device comprises a housing, at least one eccentric rotatable part and a latch spring hook having a first end attached to the at least one rotatable part, wherein the at least one receiver comprises a plate configured to receive a second end of the latch spring hook, wherein the at least one latching device and the at least one receiver are configured such that an end of said first structural member may be fastened to said second structural member, and wherein the at least one receiver comprises two support frames extending upwardly from the at least one receiver and a beam extending between upper surfaces of the support frames for receiving the latch spring hook.

7. The fastening system of claim 1, wherein the at least one latching device and the at least one receiver are configured such that an end of the first structural member may be joined to an end of the second structural member.

8. The fastening system of claim 1, wherein the at least one receiver is configured to be mounted on an external surface of said second structural member.

9. The fastening system of claim 1, wherein the at least one latching device and the at least one receiver are configured such that said first structural member may be fastened to said second structural member such that an axis of said first structural member is at an angle relative to an axis of said second structural member, wherein the angle is greater than zero degrees.

10. The fastening system of claim 9, wherein the angle is greater or less than ninety degrees.

11. The fastening system of claim 9, wherein the at least one receiver is configured such that the at least one receiver extends from an area of said second structural member defining an end of said second structural member such that said end of said second structural member may be fastened to and in contact with said first structural member.

12. The fastening system of claim 1, wherein the at least one latching device comprises a plurality of eccentric rotatable parts and a plurality of latch spring hooks, and the at least one receiver comprises one of a bail or a strike configured to receive the plurality of latch spring hooks.

13. A fastening system for joining two structural members comprising:
at least one latching device configured to be mounted on a first structural member, and
at least one receiver configured to be mounted on a second structural member,
wherein the at least one latching device comprises a housing, at least one eccentric rotatable part and a latch spring hook having a first end attached to the at least one rotatable part, and
further comprising a bail or a strike mounted to the at least one receiver on a hinge and configured to receive the latch spring hook and overlay said second structural member, and
wherein the at least one latching device and the at least one receiver are configured such that an end of said first structural member may be fastened to said second structural member.

14. A fastening system for joining two structural members comprising:
at least one latching device configured to be mounted on a first structural member, and
at least one receiver configured to be mounted on a second structural member,
wherein the at least one latching device comprises a housing, at least one eccentric rotatable part and a latch spring hook having a first end attached to the at least one rotatable part,
wherein the at least one receiver comprises a plate configured to receive a second end of the latch spring hook,
wherein the at least one latching device and the at least one receiver are configured such that an end of said first structural member may be fastened to said second structural member, and
wherein the at least one receiver further comprises tabs configured to guide the first structural member to align the at least one latching device with the receiver to fasten the first structural member to the second structural member.

15. The fastening system of claim 14, wherein the tabs are configured to guide the first structural member by engagement with the first structural member.

16. A method for fastening a first structural member to a second structural member comprising the steps of:
providing a first structural member having at least one latching device mounted on the first structural member, wherein the at least one latching device comprises a housing, at least one eccentric rotatable part and a latch spring hook having a first end attached to the at least one rotatable part,
providing a second structural member having at least one receiver mounted on the second structural member, wherein the at least one receiver is configured to receive a second end of the latch spring hook and wherein the at least one latching device and the at least one receiver are configured such that the first structural member may be fastened to said second structural member whereby at least part of the receiver is receivable within the first structural member, wherein the at least one latching device is configured such that the latch spring hook extends or is extendible from an area of said first structural member defining an end of said first structural member such that said end may be fastened to and in contact with said second structural member,
aligning the first structural member and the second structural member such that the latch spring hook is aligned with the at least one receiver,
rotating the rotatable part such that the second end of the latch spring hook engages the at least one receiver, and
further rotating the rotatable part such that the latch spring hook exerts a retractive force on the at least one receiver, thereby securing the first structural member to the second structural member.

17. The method of claim 16, wherein the at least one latching device comprises a plurality of eccentric rotating parts and a plurality of latch spring hooks, and the at least one receiver comprises one of a bail or a strike configured to receive the plurality of latch spring hooks.

18. The method of claim 17, wherein the bail or strike is mounted to the at least one receiver on a hinge.

19. The method of claim 17, wherein the plurality eccentric rotatable parts are joined by an axle.

20. The method of claim 17, wherein the at least one receiver further comprises tabs configured to guide the first structural member to align the at least one latching device with the at least one receiver to fasten the first structural member to the second structural member.

21. The method of claim 20, wherein the at least one receiver further comprises transverse locators and the housing further comprises notches corresponding to the transverse locators to guide the first structural member to align the at least one latching device with the at least one receiver to fasten the first structural member to the second structural member.

22. The method of claim 16, wherein the housing has a bottom portion with a generally semi-circular shape and the at least one receiver has a plurality of semi-circular frames having a radius corresponding to the radius of the bottom portion of the housing, wherein the first structural member can be joined at an angle to the second structural member.

23. The method of claim 22, wherein the at least one receiver comprises two support frames extending upwardly from the at least one receiver and a beam extending between upper surfaces of the support frames for receiving the latch spring hook.

24. The method of claim 16, wherein the at least one receiver comprises a base plate and a receiver plate fixedly attached to the base plate, wherein the receiver plate comprises two support frames extending upwardly from the at least one receiver and a beam extending between upper surfaces of the support frames for receiving the latch spring hook.

25. The method of claim 16, wherein the at least one latching device and the at least one receiver are configured such that an end of the first structural member may be joined to an end of the second structural member.

* * * * *